(12) United States Patent
Frejd

(10) Patent No.: US 12,036,613 B2
(45) Date of Patent: Jul. 16, 2024

(54) METHOD FOR MANUFACTURING A TOOL HEAD

(71) Applicant: SECO TOOLS AB, Fagersta (SE)

(72) Inventor: Stefan Frejd, Soderkoping (SE)

(73) Assignee: Seco Tools AB, Fagersta (SE)

( * ) Notice: Subject to any disclaimer, the term of this patent is extended or adjusted under 35 U.S.C. 154(b) by 1092 days.

(21) Appl. No.: 16/765,971

(22) PCT Filed: Nov. 22, 2018

(86) PCT No.: PCT/EP2018/082155
§ 371 (c)(1),
(2) Date: May 21, 2020

(87) PCT Pub. No.: WO2019/101083
PCT Pub. Date: May 31, 2019

(65) Prior Publication Data
US 2020/0360997 A1    Nov. 19, 2020

(30) Foreign Application Priority Data
Nov. 24, 2017  (EP) ..................................... 17203431

(51) Int. Cl.
*B22F 5/00* (2006.01)
*B22F 5/10* (2006.01)
(Continued)

(52) U.S. Cl.
CPC .................. *B22F 5/10* (2013.01); *B22F 5/00* (2013.01); *B22F 7/062* (2013.01); *B22F 10/20* (2021.01);
(Continued)

(58) Field of Classification Search
CPC ...... B22F 5/00; B22F 7/062; B22F 2005/001; B23P 15/32; B23P 15/34
(Continued)

(56) References Cited

U.S. PATENT DOCUMENTS

2002/0110432 A1* 8/2002 Puide ........................ B22F 3/20
                                                        76/108.6
2013/0223943 A1* 8/2013 Gey ......................... B23B 51/02
                                                        408/199
(Continued)

FOREIGN PATENT DOCUMENTS

JP    S62133006 A    6/1987
JP    04198404       7/1992
(Continued)

*Primary Examiner* — Omar Flores Sanchez
(74) *Attorney, Agent, or Firm* — Corinne R. Gorski

(57) ABSTRACT

A method for manufacturing a tool head includes forming a first and a second part from a powder composition. The first and the second parts include corresponding joining surfaces, and the parts have outer surface portions configured to form portions of a peripheral envelope surface of the tool head. The method further includes forming corresponding grooves in the corresponding joining surfaces, assembling the parts into a shape of a tool head by bringing the joining surfaces into contact to form an interface, so that each pair of corresponding grooves forms a channel extending in the interface, the channel having an inlet opening in a rear end of the tool head and an outlet opening in a front end or in the peripheral envelope surface of the tool head, and joining the assembled parts in a sintering operation to form the tool head.

17 Claims, 4 Drawing Sheets

(51) Int. Cl.
   *B22F 7/06*      (2006.01)
   *B22F 10/20*     (2021.01)
   *B23B 51/06*     (2006.01)
   *B23C 5/28*      (2006.01)
   *B23P 15/32*     (2006.01)
   *B23P 15/34*     (2006.01)
   *B33Y 80/00*     (2015.01)

(52) U.S. Cl.
   CPC ............... *B23B 51/06* (2013.01); *B23C 5/28* (2013.01); *B23P 15/32* (2013.01); *B23P 15/34* (2013.01); *B33Y 80/00* (2014.12); *B22F 2005/001* (2013.01)

(58) Field of Classification Search
   USPC .......................................................... 76/115
   See application file for complete search history.

(56) References Cited

U.S. PATENT DOCUMENTS

| | | | | |
|---|---|---|---|---|
| 2013/0302748 | A1* | 11/2013 | Friedrichs | A61C 3/02 |
| | | | | 156/89.28 |
| 2018/0236552 | A1* | 8/2018 | Basini | B33Y 30/00 |
| 2019/0073709 | A1* | 3/2019 | Hayes | B22F 10/20 |
| 2019/0277591 | A1* | 9/2019 | Schwartzkopf | F41A 21/30 |

FOREIGN PATENT DOCUMENTS

| | | |
|---|---|---|
| KR | 1020110004851 A | 1/2011 |
| KR | 1020110005243 A | 1/2011 |
| KR | 1020140142331 A | 12/2014 |
| KR | 1020150127686 A | 11/2016 |

* cited by examiner

METHOD FOR MANUFACTURING A TOOL HEAD

RELATED APPLICATION DATA

This application is a § 371 National Stage Application of PCT International Application No. PCT/EP2018/082155 filed Nov. 22, 2018 claiming priority to EP 17203431.6 filed Nov. 24, 2017.

TECHNICAL FIELD OF THE INVENTION

The present invention relates to a method for manufacturing a tool head of a rotary cutting tool, i.e. a tool intended for chip removing machining of workpieces, in particular metallic workpieces or workpieces made of composite material. It further relates to a tool head for use with a main body of a rotary cutting tool, and a rotary cutting tool comprising such a tool head.

BACKGROUND OF THE INVENTION AND PRIOR ART

Tool heads made of cemented carbide or cermet intended for rotary cutting tools are conventionally manufactured by pressing a composite powder into a green body by means of uniaxial or multiaxial pressing, followed by sintering of the green body. Alternatively, a green body may be formed by means of e.g. powder injection moulding (PIM) or extrusion. After sintering, cutting edges of the tool head are formed in a grinding operation, but since machining of sintered bodies is expensive, machining is preferably kept to a minimum. It is therefore desirable to obtain a sintered body having a shape which is as close as possible to the final shape of the tool head.

A cooling system that enables supply of coolant to the cutting edges normally has to be provided in a tool head to reach an optimized performance of the tool head. To minimize the need for machining after sintering, internal coolant channels are preferably formed in the green body prior to sintering.

US2013/0223943 discloses a tool head and a method for manufacturing the tool head from two separate parts that have been formed by injection moulding or die casting. The parts are assembled and jointly compressed and sintered such that a connecting zone is formed. One of the parts forms a front end of the tool head, including cutting edges, and the other part forms a rear end of the tool head. Two or more coolant channels extending from a distributor chamber are formed in the part forming the front end of the tool head, and a centre coolant channel leading to the distributor channel is formed in the part forming the rear end of the tool. The coolant channels are formed during the injection moulding process, using movable cores.

SUMMARY OF THE INVENTION

It is desirable to provide an, in at least some aspect, facilitated method of manufacturing a tool head with an improved performance.

To better address this concern, a method for manufacturing a tool head of a rotary cutting tool according to claim 1 is provided. Preferred embodiments are defined in the dependent claims.

The proposed method comprises:
forming at least a first part and a second part from a powder composition, wherein the first part comprises a first joining surface and wherein the second part comprises a second joining surface, the first joining surface being configured to be brought into contact with the second joining surface, wherein the first part further comprises a first outer surface portion configured to form a first portion of the peripheral envelope surface of the tool head, and wherein the second part further comprises a second outer surface portion configured to form a second portion of the peripheral envelope surface of the tool head, forming at least one groove in the first joining surface and at least one corresponding groove in the second joining surface, wherein the at least one groove of the first joining surface is configured to face the at least one corresponding groove of the second joining surface when the first joining surface and the second joining surface are brought into contact, assembling the parts into a shape of a tool head by bringing at least the first and second joining surfaces into contact to form an interface, so that at least one pair of facing grooves forms a channel extending in the interface, the channel having an inlet opening in the rear end of the tool head and an outlet opening in the front end and/or in the peripheral envelope surface of the tool head, joining the assembled parts in a sintering operation to form the tool head.

The proposed method enables a cost-efficient creation of channels for supply of liquid coolant (coolant channels) in the tool head without any expensive post-sintering machining for creation of coolant holes, such as electrical discharge machining (EDM). In particular, the method facilitates creation of coolant channels having a non-linear configuration, since the coolant channels are created in the interface between two preformed parts. This improves the conditions for making coolant channels with more complex shapes, thus improving the possibilities to supply coolant to all cutting edges of the tool head. For example, it facilitates creation of curved or variable cross-section coolant channels extending from the rear end of the tool head to cutting edges provided at the front end and/or at the peripheral envelope surface of the tool head. Since the coolant channels are formed from corresponding grooves, which grooves are facing each other and are extending in parallel in the interface, the coolant channels can be formed with walls without any sharp transitions or edges in a transverse direction. Pressure drops in the coolant channels can thereby be avoided and the performance of the tool head can be improved in comparison with a tool head having coolant channels in which transverse transitions or edges are present.

The grooves may preferably be formed in the respective parts as the parts are formed, e.g. by having a mould in which grooves are preformed or by having a punch with preformed grooves. This facilitates the forming of the grooves. The grooves formed in this way after sintering of the part, as well as the channel formed by the grooves upon an assembling of the parts and a subsequend joining of the parts in a sintering operation, have a direct pressed surface which is a smooth surface having an arithmetic average roughness Ra≤3 µm. The arithmetic average roughness value depends on the size of the grains of the powder, the amount of the binder in the powder composition and the surface finish of the mould or the punch that has formed the groove. As the parts preferably are also cleaned after the sintering and before the assembling, the cleaning process, such as blasting, has also some influence on the arithmetic average roughness value. In most cases the arithmetic average roughness value Ra is less than 0.5 µm, sometimes as low as 0.1 µm. The grooves in the first part and/or the second part can also be grinded after a sintering of the parts and before assembling the parts and joining the assembled parts in a sintering operation. Grinding can be used to obtain even smoother surface having an improved surface roughness and/or to form the grooves. A grinded surface has an arithmetic average surface roughness typically within the interval 0.1≤Ra≤1.6 sometimes even better/smaller value. It is also possible to apply other treatments to improve the surface roughness of the grooves, such as polishing of the grooves, which gives even better surface finish of the groove than grinding. A benefit with a smooth surface of a groove, i.e. a direct pressed surface or a grinded surface or a polished surface or a surface having a surface roughness Ra≤3 µm, is that pressure drops in the coolant channels can be avoided and the performance of the tool head can be improved.

Preferably, the first portion and the second portion of the peripheral envelope surface extend from the front end to the rear end of the tool head. Outer surfaces of the respective parts thereby together form an entire peripheral surface of the tool head.

The sintering operation is preferably a liquid phase sintering operation, i.e. a sintering operation in which a binder of the powder composition melts and solid grains coexist with wetting liquid binder. In the case of cemented carbide, this means solid grains of tungsten carbide (WC) and liquid phase cobalt (Co). The sintering temperature should thus be above a temperature of at least 1250° C. for WC-Co based cemented carbide.

According to one embodiment, the method comprises forming the parts using one of powder injection moulding, multiaxial pressing, uniaxial pressing and additive manufacturing.

By means of powder injection moulding (PIM), relatively complex shapes can be formed with a more smooth surface finish and in a more cost-efficient manner in comparison with e.g. additive manufacturing. PIM is therefore particularly suitable for cost-efficient forming of parts that have a variable material thickness, and for formation of grooves of variable dimension or bent grooves. The grooves formed in this way, as well as the channel formed by the grooves, upon a subsequent sintering operation, have a smooth surface, i.e. a surface having an arithmetic average roughness Ra≤3 µm. Also in this case, the arithmetic average roughness value depends on the size of the grains of the powder, the powder composition and the process parameters. In most cases the arithmetic average roughness value Ra is less than 1 µm and in many cases less than 0.5 µm. The grooves in the first part and/or the second part can also be grinded after a sintering and before assembling the parts and joining the assembled parts in a sintering operation. Grinding can be used to obtain even smoother surface having an improved arithmetic average roughness. A grinded surface has a typical surface roughness Ra withing the interval 0.1≤Ra≤1.6 sometimes even better/smaller. It is also possible to apply other treatments to improve the surface roughness of the grooves, such as polishing, which gives even better surface finish than grinding. A benefit with a smooth surface of a groove, i.e. a direct pressed surface or a grinded surface or a polished surface or a surface created by means of powder injection moulding or a surface having a surface roughness Ra≤3 µm, is that pressure drops in the coolant channels can be avoided and the performance of the tool head can be improved.

By means of additive manufacturing, usually relying upon layer-by-layer deposition of material, complex shapes can be formed.

Multiaxial and uniaxial pressing are cost-efficient alternatives for creation of less complex shapes, since they enable fast production of parts with a high shape accuracy. By means of multiaxial pressing, more complex shapes can be formed than by means of uniaxial pressing. The formation of grooves in the joining surfaces enables a more efficient production process in comparison with processes in which movable cores are used for forming coolant channels.

According to one embodiment, assembling the parts comprises assembling the parts in a non-sintered condition. Only one sintering operation is thereby necessary, and smooth joining surfaces can normally be obtained without grinding, making the complexity of the production process relatively low. The sintering conditions in the joining sintering operation, such as time, pressure and temperature, depend on the material of the parts, but should preferably be such that liquid phase sintering occurs. The sintering may e.g. be performed at a sintering temperature of 1350-1500° C. in the case of cemented carbide.

According to one embodiment, the method further comprises sintering of the parts prior to assembling the parts. In this case, the joining surfaces of the sintered parts should preferably be ground to produce smooth joining surfaces prior to assembling the parts.

According to one embodiment, the method comprises forming the first and second parts into an identical or substantially identical shape. The parts can thereby be formed using the same tool or mould. Making all parts identical also facilitates the assembling process since there is no need to keep track of different kinds of parts. Moreover, the tool head becomes symmetric about the centre axis, which leads to desirable dynamic properties.

According to one embodiment, the method comprises forming the parts so that, when assembling the parts, the first and second joining surfaces extend along the centre axis of the tool head. Preferably, the joining surfaces may extend in parallel with the centre axis. This contributes to desirable dynamic properties of the tool head, such as a reduced tendency to vibrate.

The parts may also be formed so that the first and second joining surfaces extend at an angle with respect to the centre axis of the tool head. The angle should preferably be such that channels formed in the interface have an opening close to a cutting edge of the tool head. The angle is preferably such that the interface intersects a rear end surface and/or a front end surface of the tool head. Most preferably, the angle is such that the interface intersects the rear end surface, the front end surface and the peripheral envelope surface.

According to one embodiment, the method comprises forming the at least one groove as a curved groove and/or comprising forming the at least one groove as a groove having a variable cross-sectional shape and/or size. The coolant channels may e.g. be formed with a helical extension around the centre axis of the tool head, and/or be formed with a cross-sectional shape and/or area that varies along the coolant channel. The coolant channels may furthermore be curved in a plane parallel with the centre axis. The channels can thereby be customized to achieve desired properties of a coolant flow. A curved groove is a groove that deviates from straightness in a smooth, continuous fashion. The radius of curvature of a curved part of the groove can be constant or vary along the curved part. The curved part of the groove extends preferably at least along 5% or at least along 10% or at least along 20% or at least along 30% or at least along 40% or at least along 50% or at least along 60% or at least along 70% or at least along 80% or at least along 90% of the length of the tool head. Preferably, the curved part of the groove constitutes at least 5% or at least 10% or at least 20% or at least 30% or at least 40% or at least 50% or at least 60% or at least 70% or at least 80% or at least 90% of the total length of the groove measured from the inlet opening in the rear end of the tool head to the outlet opening in the front end. After assembling the first part and the second part into a shape of a tool head and after joining the assembled parts in a sintering operation to form the tool head, the formed channel will have at least one curved part. The curved grooves in the first part respective the second part may be arranged such that a center axis of the curved part of the channel, which channel is formed after assembling the first part and the second part and after joining the assembled parts in a sintering operation to form the tool head, is continuously curved at the same time as a shortest distance from the center axis of the curved part of the channel to the center axis of the tool head changes continuously along the curved part of the channel.

According to one embodiment, the method comprises forming at least a portion of the at least one groove with a smooth surface, preferably forming a major portion of the at least one groove with a smooth surface, more preferably forming the entire at least one groove with a smooth surface. In this embodiment, the parts are preferably formed using PIM or uniaxial pressing or multiaxial pressing, which produces a smooth surface. The smooth surface with low surface roughness is desirable for achieving coolant channels with low pressure drop. A smooth surface of a groove is a surface that preferably has an arithmetic average roughness $Ra \leq 3$ µm, more preferably an arithmetic average roughness $Ra \leq 2$ µm, even more preferably an arithmetic average roughness $Ra \leq 1$ µm, and most preferably an arithmetic average roughness $Ra \leq 0.5$ µm; preferably when measured in any direction. A smooth surface of a groove is preferably a direct pressed surface or preferabably a grinded surface or preferably a polished surface or preferably a surface created by means of powder injection moulding.

According to one embodiment, forming the at least one groove comprises forming, in each of the first joining surface and the second joining surface, at least two grooves extending from a common depression so that, when assembling the first and second parts, at least two channels sharing a common inlet opening in the rear end of the tool head are formed in the interface. Several coolant channels can thereby be provided, which may all be supplied with coolant from a common coolant duct of a main body of the cutting tool. The common duct can be a central duct.

According to one embodiment, the method further comprises providing the tool head with at least one cutting edge, wherein each of the at least one cutting edge is provided in adjacency to the outlet opening of at least one of the channels. The outlet opening of each channel is positioned such that coolant provided via the respective channel can be used to cool the associated cutting edge. Supply of coolant to all cutting edges is ensured, so that appropriate cooling of all cutting edges can be achieved. The cutting edges may e.g. be preformed in the parts and ground to final shape and sharpness after joining of the assembled parts.

According to one embodiment, the method comprises forming at least three parts, wherein a number of parts correspond to a number of cutting edges provided in the tool head. This is advantageous for tool heads having more than two cutting edges arranged in the front end and/or in the peripheral envelope surface and/or in a transition between the front end and the peripheral envelope surface, since channels for coolant can be provided in all interfaces and thus all cutting edges can be appropriately cooled.

According to one embodiment, the method comprises providing the joining surfaces with positioning means, wherein the positioning means of the first joining surface is configured to be engageable with the positioning means of the second joining surface, such that a relative position of the first and second parts during sintering is secured. This facilitates assembling and ensures correct alignment during sintering. Assembling the parts in this case comprises bringing the positioning means of corresponding joining surfaces into engagement with each other. The positioning means can e.g. be in the form of protrusions and recesses.

According to one embodiment, the powder composition is a hard metal powder composition or a cermet powder composition. The hard metal powder composition may e.g. be a cemented carbide powder composition comprising a carbide and a binder, such as WC and Co. In addition to WC and Co one or more of the following may also be included: metal carbides with the general composition (Ti, Nb, Ta)C, chromium (Cr), metal carbonitrides, e.g. titanium carbonitride (Ti(C, N)). The binder may, apart from Co, comprise combinations of Co, Ni and Fe, or Ni and Fe.

Preferably, the at least two parts are made of the same powder composition.

After joining the parts in a sintering operation, the tool head may be ground or otherwise machined into its final shape, e.g. provided with cutting edges and clearance surfaces. It may furthermore be provided with a coating, such as a physical vapour deposition (PVD) or chemical vapour deposition (CVD) coating.

According to another aspect of the invention, a tool head for use with a main body of a rotary cutting tool according to the independent product claim is provided. The tool head has a front end and a rear end between which a centre axis of rotation and a peripheral envelope surface extend,
  wherein the rear end is configured to be connected to the main body and wherein the front end is configured for cutting engagement with a workpiece,
  wherein the tool head comprises at least one channel intended for transporting liquid coolant to a cutting edge of the tool head, each of the at least one channel extending from an inlet opening in the rear end of the tool head to an outlet opening in the front end or in the peripheral envelope surface of the tool head,
  wherein the at least one channel is formed in at least one interface formed as a result of joining at least two parts to form the tool head, each part being formed from a powder composition.

The proposed tool head may be configured to be exchangeable. In that case, the tool head is provided with an interface for fastening the tool head to the main body, e.g. by means of male/female engagement means. The tool head may also be configured to be permanently attached to a main body of a rotary cutting tool. The tool head has preferably been manufactured in accordance with the proposed method according to any one of the above described embodiments.

The tool head may further be configured for drilling or for milling.

The interface in which the channels are formed normally obtains the same microstructure as the other parts of the tool head. Internal edges, extending in the channels in a lengthwise direction, may be formed as a result of the manufacturing process. Since the edges extend in the lengthwise direction, they have a minimal impact on the flow of coolant through the channels.

According to another aspect of the invention, a rotary cutting tool comprising a main body and the proposed tool head is provided. The rotary cutting tool may be a drilling tool or a milling tool.

The main body may comprise a central coolant duct for providing coolant to the tool head. The main body may alternatively comprise two or more coolant ducts, each duct configured to be connected to a channel of the tool head. The main body may be made of metal, e.g. steel alloy, or be made of hard metal, such as cemented carbide, or cermet. The tool head may be formed integrally with the main body, be permanently attached to the main body, or be releasably attached, i.e. exchangeable.

According to one embodiment, the tool head has been joined to the main body by means of sintering. The tool head and the main body are thereby securely joined, but the main body and the tool head may be made of different materials. For example, the main body may be made of a cheaper grade than the tool head. If cemented carbide is used for the tool head, the main body may also be formed of cemented carbide, but with a different composition.

Further advantageous features and advantages of the invention will appear from the following detailed description.

BRIEF DESCRIPTION OF THE DRAWINGS

Embodiments of the invention will in the following be described by means of example with reference to the appended drawings, in which.

DETAILED DESCRIPTION OF EMBODIMENTS OF THE INVENTION

Figure 1:
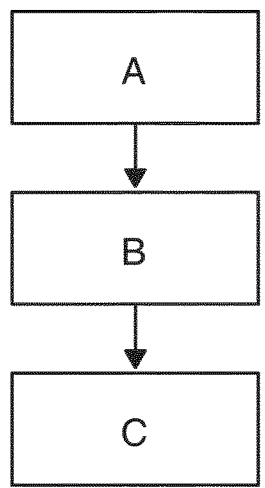
FIG. 1 is a flow chart illustrating a method according to an embodiment of the invention.

A method for forming a tool head according to an embodiment of the invention is schematically illustrated in the flow chart in FIG. 1. The method comprises the following steps A-C:

A: Forming a first part and a second part of a tool head from a powder composition comprising a binder phase in the form of a metal and a hard phase in the form of e.g. a carbide and/or a carbonitride and/or a nitride.

B: Assembling the first and second parts into a shape of a tool head.

C: Joining the assembled parts in a sintering operation to form the tool head.

Subsequent to step C, the formed tool head is machined to form e.g. cutting edges and clearance surfaces, and the tool head may also be provided with a coating. The final configurations of the tool heads, including e.g. chisel cutting edges and clearance surfaces, are not shown in the drawings.

Figure 6:
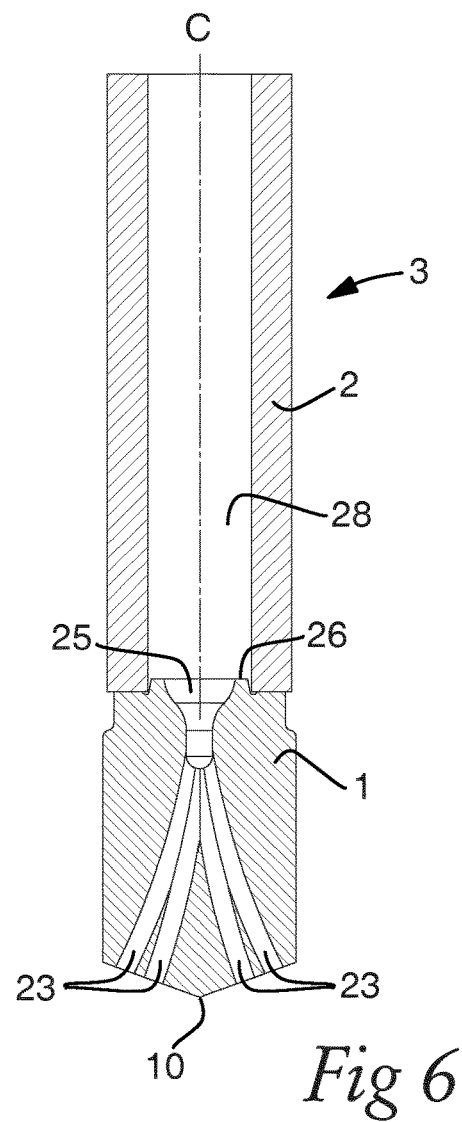
FIG. 6 is a cross sectional view showing a drilling tool comprising the tool head according to the first embodiment.
Figure 7:
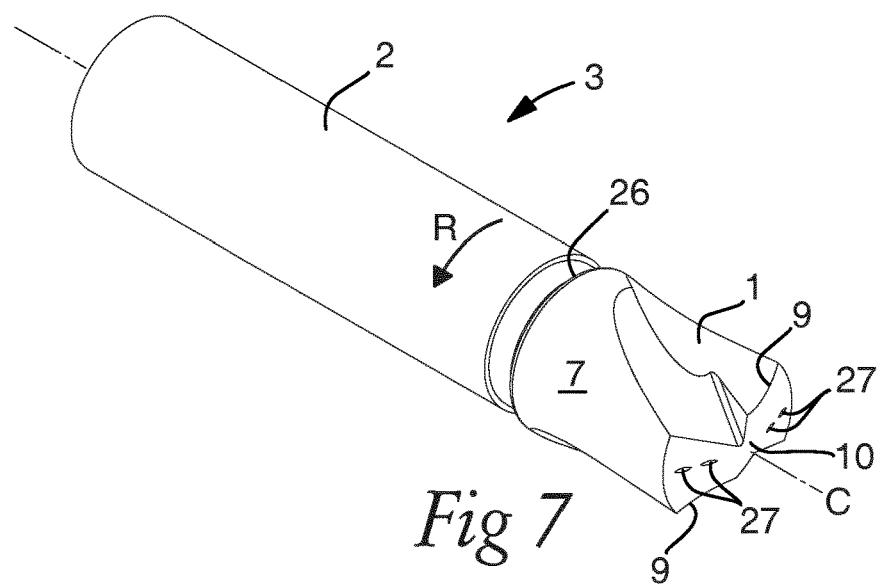
FIG. 7 is a perspective view of the drilling tool in FIG. 6.
Figure 8:
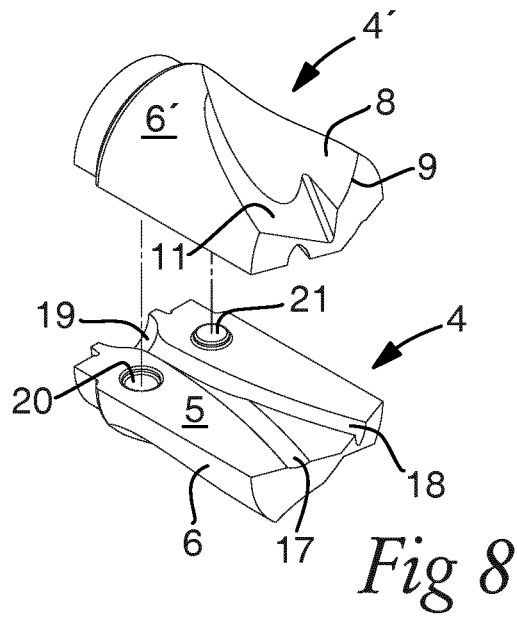
FIG. 8 is a perspective view of two parts for forming a tool head according to a second embodiment.
Figure 9:
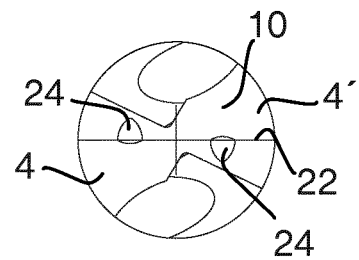
FIG. 9 is a front end view showing the parts in FIG. 8 assembled to form a tool head.
Figure 10:
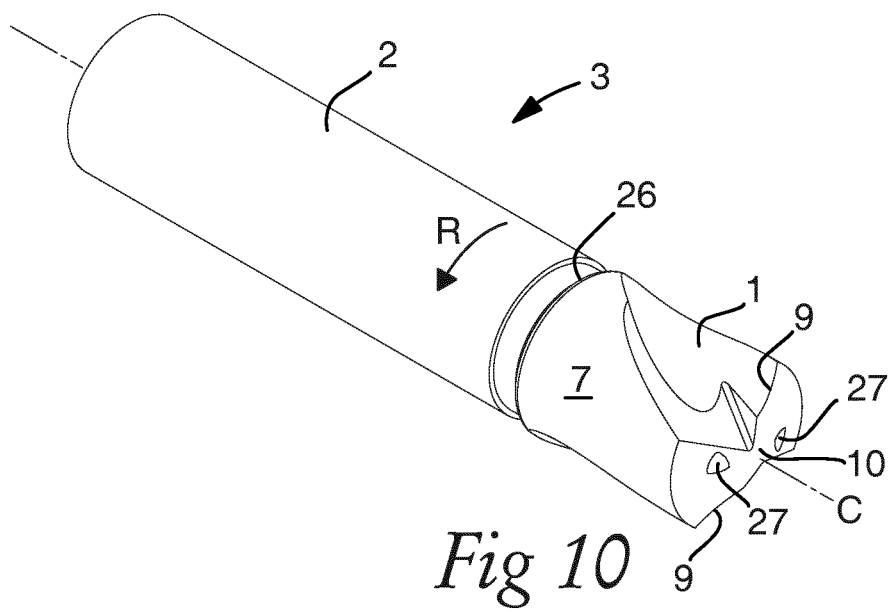
FIG. 10 is a perspective view showing a drilling tool comprising the tool head according to the second embodiment.

Reference is now made to FIGS. 2-10, showing manufacturing of a tool head 1 according to a first embodiment (FIGS. 2-7) and a second embodiment (FIGS. 8-10). The same reference numbers are used for the same or corresponding features. The tool head 1 is intended to be permanently attached to a main body 2 to form a rotatory cutting tool 3, the tool head and the main body extending along a common centre axis C around which the tool 3 is rotatable in a direction R. The tool head 1 can also be an exchangeable head detachably attachable to the main body. In that case, the tool head is provided with a coupling interface.

Step A

First and second parts 4, 4' for a tool head 1 according to the first embodiment are shown in FIGS. 2-5, and first and second parts 4, 4' for a tool head according to a second embodiment of the invention are shown in FIGS. 8-9, respectively. The first part 4 and the second part 4' correspond to a first half and a second half of the tool head 1 to be formed, respectively. In the shown embodiments, the first part 4 and the second part 4' are identical.

Figure 2:
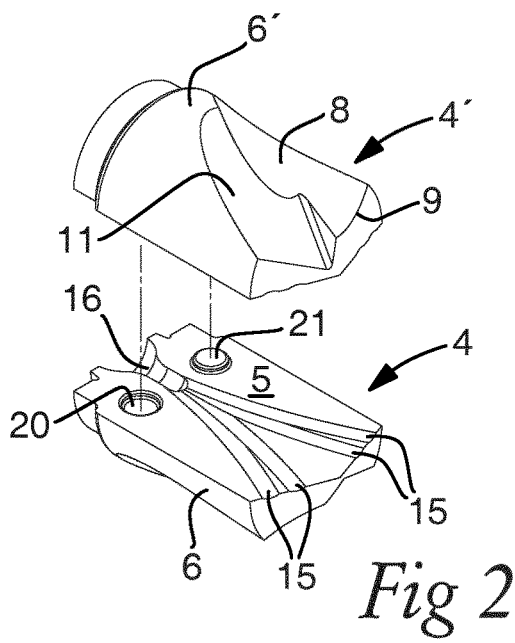
FIG. 2 is a perspective view of two parts for forming a tool head according to a first embodiment.
Figure 3:
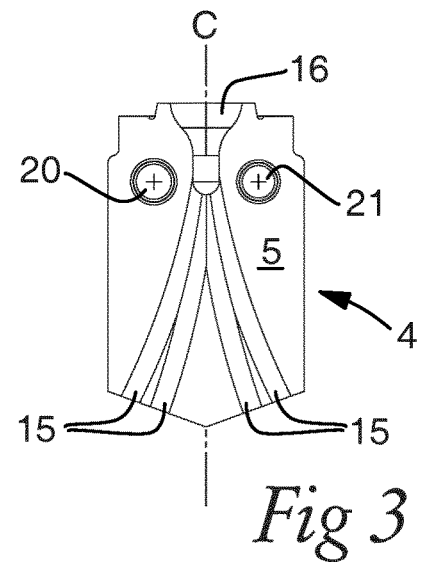
FIG. 3 is a side view of a part from FIG. 2.

As shown in FIGS. 2-3 and FIG. 8, respectively, the first part 4 comprises a first joining surface 5 and the second part 4', being identical, comprises an identical second joining surface, configured to be brought into contact with the first joining surface 5 in step B. The joining surfaces 5 extend in parallel to the centre axis C of the tool head 1 to be formed. The first part 4 further comprises a first outer surface portion 6 and the second part 4' comprises an identical second outer surface portion 6'. Each outer surface portion 6, 6' is configured to form a first portion and a second portion, respectively, of a peripheral envelope surface 7 of the tool head 1.

In each part, a chip flute 8 is preformed, so that a cutting edge can later on be created in a grinding operation at an intersection 9 between the chip flute 8 and a front end 10 of the tool head 1. A gash 11 widening the chip flute 8 at the front end 10 of the tool head 1 is also provided.

In the first embodiment, four grooves 15 having an identical rounded shallow cross sectional shape are formed in each joining surface 5. The grooves 15 of the first joining surface 5 are configured to face the corresponding grooves of the second joining surface. Each groove 15 extends from a common central depression 16 formed at a rear end of the part 4, to a front end of the part 4. The grooves 15 are bent with a relatively large radius of curvature.

In the second embodiment, two bent grooves 17, 18 are formed in each joining surface 5. The grooves 17, 18 extend from a common depression 19. Of the two grooves 17, 18 formed in each joining surface 5, one groove 17 is relatively shallow and one groove 18 is relatively deep. The grooves 17, 18 are shaped so that a resulting channel formed from the two grooves 17, 18 obtains a cross-sectional shape of a so called Reuleaux triangle. This cross-sectional shape prevents rotational motion of coolant about a longitudinal axis of the channels. Such a rotational motion may otherwise result in a pressure drop within the channels.

In both embodiments, the grooves 15, 17, 18 have a smooth or substantially smooth surface, without transverse ridges or similar that would affect a flow of coolant through channels formed by the grooves.

In each joining surface 5, positioning means in the form of one recess 20 and one projection 21 are formed.

The parts 4 of the embodiments illustrated in FIGS. 2-5 and FIGS. 8-9, respectively, may be formed using powder injection moulding (PIM). Forming the parts using PIM comprises the following consecutive steps:
i) Mixing of granulated composite powder, e.g. a cemented carbide powder composition comprising WC and Co, with a binder system, such as a polymer, to form a feedstock.
ii) Performing injection moulding using the feedstock, comprising heating the feedstock to 100-240° C., forcing the feedstock into a mould formed as the part, cooling, and removing the obtained part from the mould.
iii) Removing the binder system from the obtained part (debinding).

If necessary, irregularities may be removed from the parts prior to step B.

Step B

Figure 4:
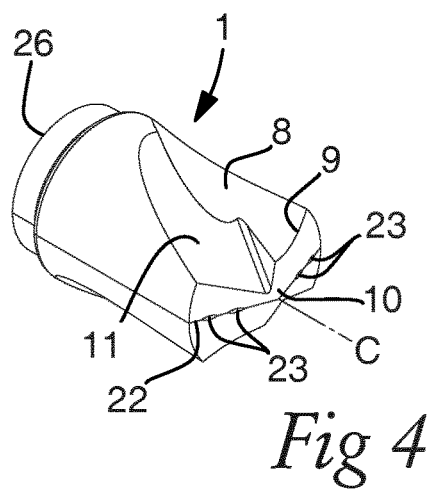
FIG. 4 is a perspective view showing the parts in FIG. 2 assembled to form a tool head.
Figure 5:
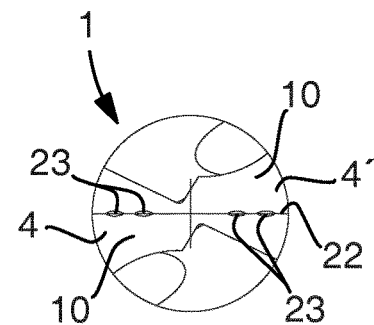
FIG. 5 is a front end view of the assembled parts from FIG. 4.

To assemble the parts 4, 4' into a shape of a tool head as shown in FIGS. 4-5 and FIG. 9, respectively, the first and second joining surfaces 5 are brought into contact to form an interface 22, so that each pair of facing grooves 15, 17, 18 forms a channel extending in the interface 22. In the first embodiment, four channels 23 are formed in the interface 22, and in the second embodiment, two channels 24 are formed. The channels extend from a common inlet opening 25 in a rear end 26 of the tool head 1 to outlet openings 27 in the front end 10 of the tool head 1. The positioning means 20, 21 ensure a correct alignment of the parts 4, 4' as the positioning means 20, 21 of the first joining surface 5 are brought into engagement with the positioning means of the second joining surface. The interface 22 extends in parallel with the centre axis C, so that the interface intersects a peripheral surface of the tool head 1 at the front end 10, at the rear end 26 and at the peripheral envelope surface 7.

The formed tool head 1 is rotationally symmetric about the centre axis C. The front end 10 of the tool head 1 will be configured for cutting engagement with a workpiece when the tool head 1 is rotated in the direction R about the centre axis C.

Step C

The sintering is performed at a temperature and time such that the binder phase, i.e. the metal of the composite powder, is in a liquid state during at least one minute. The temperature may e.g. be in the interval 1350-1500° C. during a time period of 10-120 minutes. The time and temperature used depend on the material composition, but also on the size and shape of the parts 4.

In an alternative embodiment, the individual parts 4 are sintered after step A, i.e. prior to assembling the parts. The sintered parts are thereafter assembled as previously described. The final sintering operation in which the parts are joined can in this case be shortened in order not to alter the material properties of the tool head. A time period of 10-20 minutes may, depending on size, composition and shape of the parts, be sufficient.

In the first and second embodiments, the sintered tool head 1 is joined to the main body 2 in another sintering operation to form the rotary cutting tool 3, here in the form of a drilling tool as shown in FIGS. 6-7 and FIG. 10, respectively. The main body 2 has in the shown embodiments been formed by extrusion followed by sintering. It comprises a central coolant duct 28 for supply of liquid coolant to the tool head 1. The common central inlet opening 25 in the rear end 26 of the tool head 1 is therefore connected to the central coolant duct 28 of the main body 2.

Figure 11:
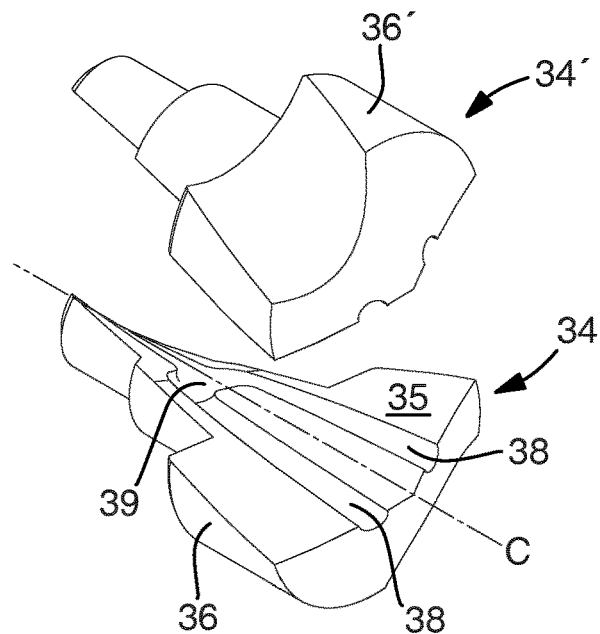
FIG. 11 is a perspective view of two parts for forming a tool head according to a third embodiment.
Figure 12:
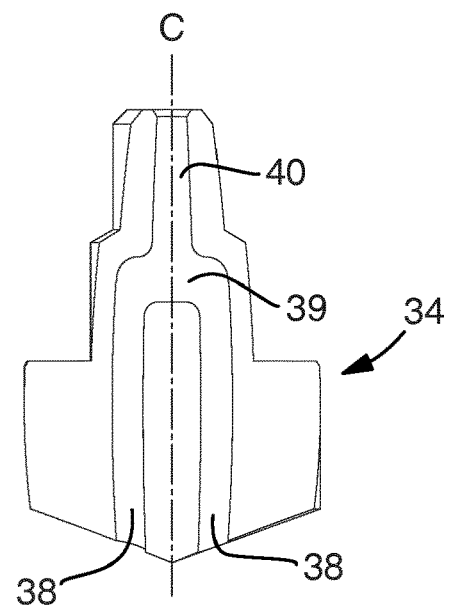
FIG. 12 is a side view of a part from FIG. 11.
Figure 13:
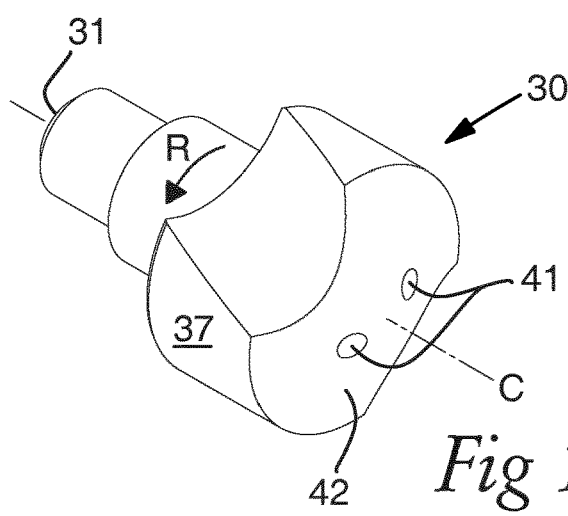
FIG. 13 is a perspective view of a tool head according to the third embodiment.

FIGS. 11-13 illustrate the manufacturing of an exchangeable tool head 30 according to a third embodiment of the invention. The tool head 30 is intended for use with a main body (not shown) of a drilling tool, wherein the main body is made of e.g. steel. A rear end 31 of the tool head 30 as shown is to be machined to form engagement means for securely attaching the tool head 30 to the main body (not shown). The tool head 30 is rotationally symmetric about a centre axis C around which the tool head is rotatable in a direction R.

For manufacturing of the tool head 30, a first part 34 and an identical second part 34' are formed in step A. However, in this embodiment, the parts 34, 34' are preferably formed from composite powder in a multiaxial pressing process instead of using PIM.

The first part 34 comprises a first joining surface 35 and the second part 34' comprises an identical second joining surface, configured to be brought into contact with the first joining surface 35 in step B. Like in the first and second embodiments, the first part 34 further comprises a first outer surface portion 36 and the second part 34' comprises an identical second outer surface portion 36'. Each outer surface portion 36, 36' is configured to form a first portion and a second portion, respectively, of a peripheral envelope surface 37 of the tool head 30.

The joining surfaces 35 lack positioning means. Instead, the joining surfaces 35 are twisted around the centre axis C, so that the parts 34, 34' will automatically be aligned during assembly. In each joining surface 35, two front grooves 38 are formed in the pressing process, extending from a common depression 39 close to a rear end of the part 34 to a front end of the part 34. A common rear groove 40 extends from the common depression 39 to the rear end of the part 34. All grooves 38, 40 have a smooth or substantially smooth surface.

As the parts 34, 34' are assembled in step B, the front grooves 38 form two front channels 41 with circular cross sections extending in the interface between the assembled parts 34, 34'. The front channels 41 have outlet openings in a front end 42 of the tool head 30, adjacent to cutting edges that will be formed later on in a grinding operation. The rear grooves 40 form a common rear channel (not shown) extending from an inlet opening in the rear end 31 of the tool head 30 to a central distribution chamber formed by the common depressions 39. Liquid coolant can thereby be supplied via the common rear channel, the distribution chamber and the front channels 41 to the outlet openings at the front end 42 of the tool head 30.

The assembled parts 34, 34' are joined in a sintering operation in step C as described above. After joining, the tool head 30 is machined to obtain its final shape (not shown), including cutting edges and engagement means for mounting the tool head 30 in a front seat of the main body, wherein the main body is configured to be mounted in e.g. a spindle of a machine.

The invention is of course not limited to the embodiments disclosed, but may be varied and modified within the scope of the following claims. For instance, the parts that are used to form the tool head do not need to be identical, and more than two parts may be used, such as three parts having joining surfaces extending along the centre axis. Furthermore, the rotary cutting tool may instead of a drilling tool be a milling tool, in which case the channels preferably have outlet openings provided in the peripheral envelope surface of the tool head, close to cutting edges of the milling tool.

The invention claimed is:

1. A method for manufacturing a tool head of a rotary cutting tool, the tool head having a front end and a rear end between which a centre axis of rotation and a peripheral envelope surface extend, the method comprising:
    forming at least a first part and a second part from a powder composition, wherein the first part has a first joining surface and wherein the second part has a second joining surface, the first joining surface being configured to be brought into contact with the second joining surface, wherein the first part further includes a first outer surface portion configured to form a first portion of the peripheral envelope surface of the tool head, and wherein the second part further includes a second outer surface portion configured to form a second portion of the peripheral envelope surface of the tool head;
    forming at least one groove in the first joining surface and at least one corresponding groove in the second joining surface, wherein the at least one groove of the first joining surface is configured to face the at least one corresponding groove of the second joining surface when the first joining surface and the second joining surface are brought into contact;
    forming at least a portion of the at least one groove with a smooth surface, wherein the smooth surface of the at least one portion of the at least one groove is a surface that has an arithmetic average roughness Ra≤3 μm, when measured in any direction, wherein the smooth surface is selected from a direct pressed surface, a grinded surface, a polished surface and a surface created by means of powder injection moulding;
    assembling the first and second parts into a shape of a tool head by bringing at least the first and second joining surfaces into contact to form an interface, so that at least one pair of the facing at least one and at least one corresponding grooves forms a channel extending in the interface, the channel having an inlet opening in the rear end of the tool head and an outlet opening in the front end and/or in the peripheral envelope surface of the tool head; and
    joining the assembled first and second parts in a sintering operation to form the tool head.

2. The method according to claim 1, wherein forming the first and second parts includes using one of a powder injection moulding, multiaxial pressing, uniaxial pressing and additive manufacturing process.

3. The method according to claim 1, wherein assembling the parts comprises assembling the parts in a non-sintered condition.

4. The method according to claim 1, further comprising forming the first and second parts into an identical or substantially identical shape.

5. The method according to claim 1, comprising forming the first and second parts so that, when assembling the first and second parts, the first and second joining surfaces extend along the centre axis of the tool head.

6. The method according to claim 1, comprising forming the at least one groove as a curved groove.

7. The method according to claim 1, wherein forming the at least one groove includes forming, in each of the first joining surface and the second joining surface, at least two grooves extending from a common depression so that, when assembling the first and second parts, at least two channels sharing a common inlet opening in the rear end of the tool head are formed in the interface.

8. The method according claim 1, further comprising providing the tool head with at least one cutting edge, wherein the at least one cutting edge is provided in adjacency to the outlet opening of the channel.

9. The method according to claim 7, comprising forming at least three parts, wherein a number of parts correspond to a number of cutting edges provided in the tool head.

10. The method according to claim 1, comprising providing the first and second joining surfaces with positioning means, wherein the positioning means of the first joining surface is configured to be engageable with the positioning means of the second joining surface, such that a relative position of the first and second parts during sintering is secured.

11. The method according to claim 1, wherein the powder composition is a hard metal powder composition or a cermet powder composition.

12. A tool head for use with a main body of a rotary cutting tool, the tool head comprising:
    a front end and a rear end between which a centre axis of rotation and a peripheral envelope surface extend, wherein the rear end is configured to be connected to the main body and wherein the front end is configured for cutting engagement with a workpiece; and
    at least one channel arranged for transporting liquid coolant to a cutting edge of the tool head, the at least one channel extending from an inlet opening in the rear end of the tool head to an outlet opening in the front end or in the peripheral envelope surface of the tool head, wherein the at least one channel is formed in at least one interface formed as a result of joining at least two parts to form the tool head, each part of the at least two parts being formed from a powder composition, wherein the at least one channel is formed by forming at least one groove in a first joining surface of one of the at least two parts and at least one corresponding groove in a second joining surface of another of the at least two parts, wherein the at least one groove of the first joining surface is configured to face the at least one corresponding groove of the second joining surface when the first joining surface and the second joining surface are brought into contact, and wherein at least a portion of the at least one groove has a smooth surface, wherein the smooth surface of the at least one portion of the at least one groove is a surface that has an arithmetic average roughness Ra≤3 μm, when measured in any direction, wherein the smooth surface is selected from a direct pressed surface, a grinded surface, a polished surface and a surface created by means of powder injection moulding.

13. A rotary cutting tool comprising a main body and a tool head according to claim 11.

14. The rotary cutting tool according to claim 12, wherein the tool head has been joined to the main body by means of sintering.

15. The method according to claim 1, further comprising forming the at least one groove as a groove having a variable cross-sectional shape and/or size.

16. The method according to claim 1, further comprising forming a major portion of the at least one groove with a smooth surface.

17. The method according to claim 1, further comprising forming the entire at least one groove with a smooth surface.

* * * * *